Patented Oct. 30, 1928.

1,689,570

UNITED STATES PATENT OFFICE.

WILLIAM BURTON WESCOTT, OF BOSTON, MASSACHUSETTS, ASSIGNOR TO THE RUBBER LATEX RESEARCH CORPORATION, OF BOSTON, MASSACHUSETTS, A CORPORATION OF MASSACHUSETTS.

PROCESS OF MAKING REENFORCED HARD RUBBER.

No Drawing. Original application filed November 18, 1922, Serial No. 601,910. Divided and this application filed December 23, 1926. Serial No. 156,764.

This invention relates to reenforced hard rubber and process of making the same: and it comprises an article of ebonite or hard rubber strengthened and reenforced by contained distributed long vegetable or mineral fiber therein, such fiber being usually cotton and such rubber extending into and permeating the fiber; and it further comprises a method of producing such a reenforced hard rubber article wherein finely divided hard rubber is admixed with finely divided partially cured rubber, such as buffings, sulfur and relatively long fibers and the mass moistened with a solution of latex, dried, shaped and vulcanized; all as more fully hereinafter set forth and as claimed.

The present invention relates to the production of hard rubber articles containing distributed reenforcing fiber of substantial length, the rubber permeating the fiber. The hard rubber may occur merely in the quantity requisite to serve as a bonding means in making articles of granular material; and particularly abrasive articles. This, however, I do not herein specifically claim, it forming the subject matter of another and copending application, Serial No. 601,910, filed November 18, 1922, whereof the present application is a division.

In the usual compounding of rubber to make such materials as hard rubber, the rubber and the compounding ingredients added thereto are milled together. Where the filler is finely divided, as in the case of whiting, zinc oxid, etc., the milling accomplishes the desired result; but the situation is different when compounding ingredients of a coarser nature are to occur in the final products and the comminution taking place in the milling is undesirable. In particular the exigencies of milling preclude the use of fiber of effective length as a reenforcing and strengthening ingredient. Fiber is extremely desirable in such compositions for reenforcing and toughening; but milling breaks up and disintegrates it. Any fiber added to the composition and milled therewith, to the extent necessary to produce uniform distribution is disintegrated and reduced to extremely short lengths. Heretofore the only practicable way of incorporating long fiber or other comparatively coarse ingredients into rubber compositions of any kind has been the use of the so-called "rubber solutions," and these are not only unsatisfactory but, because of the solvents necessarily used, are more or less dangerous. Rubber solutions can be, and are, used for cementing fabrics and cords in making built-up structures but they are not suitable for making compositions containing distributed fiber in minor proportions and in random arrangement. It is one object of this invention to produce hard rubber articles containing distributed fibers of substantial length and in random arrangement in a simple and ready manner, with economies in the use of material and safety in operation.

In making my composition I take advantage of the properties of latex or rubber emulsions containing the caoutchouc of latex. Latex is the milky sap of various plants and can be obtained carrying as high as 20 to 30 per cent of caoutchouc. Whether this caoutchouc as it is contained in the latex emulsion is the same chemically as the ordinary "caoutchouc" of raw rubber is an undecided question. For the present purposes it is convenient to call it by that name. Latex readily coagulates or clots, with production of ordinary raw rubber as a reticulated or veined coagulum; the coagulum not being homogeneous. Acids, creosote and various other chemicals produce coagulation; and coagulation even takes place on mechanical agitation. Latex can, however, be shielded against coagulation by the presence of various stabilizing chemicals, mostly of an alkaline nature. Ammonia is the most convenient stabilizer. Various purified and concentrated standardized preparations having the properties of rubber emulsions or caoutchouc emulsions may be made from latex by the expedient of segregating more concentrated emulsions from latex in a centrifugal separator, wherein the segregated portions may be washed, treated with alkaline solutions, etc., as more fully described and claimed in my copending application, Serial No. 601,909, filed November 18, 1922. In the present invention, I may use either the ordinary latex, stabilized with a little alkali, or the stated similar purer uncoagulated standardized preparations made therefrom.

On drying down, latex at first gives a gel, this gel formation being "irreversible," and then a film or body of strong, resilient and tough caoutchouc; this dried gel, unlike the rubber produced in coagulation, being substantially homogeneous physically. The caoutchouc of the dried gel also differs materially from coagulation rubber in other respects, notably in its reactions with sulfur. In vulcanization, it behaves more like long milled rubber than like raw rubber.

In the present invention, in lieu of milling or grinding together the materials which are to be compounded in making hard rubber, I simply mix them and incorporate sufficient latex or the latex preparations mentioned to act as a bonding agent, dry, shape and vulcanize. On drying, the latex yields intergranular films of dried gel bonding together and uniting the several ingredients. As will be observed, in operating in this way it is possible to incorporate any desired amount of any desired fiber; no milling or long-continued mechanical working being necessary.

Operating in this way, I am also enabled to use various waste rubber materials as substantial components such as hard rubber waste, rubber buffings, etc., with substantial economies in operation. On vulcanization these materials, together with the latex caoutchouc, are converted into an integral mass of hard rubber.

In practicing my invention, I ordinarily employ a large proportion, say, 30 per cent or so, of hard rubber waste reduced to a fine state. Buffings may be employed. With this I admix a certain amount of finely divided rubber in which the curing has not been carried to completion. Buffings from partially cured articles may be used. The amount of this partially cured rubber may be around 30 per cent. With these two grades of rubber, I admix sulfur in excess of the amount required for hard vulcanization and also such an amount of fiber as I may deem desirable in the finished article. Disintegrated rubber-frictioned cotton fabric as produced in the usual process of reclaiming rubber from old tires and the like may be used. It carries both long fiber and partially cured rubber and may be used without an addition of hard rubber.

In making my mix, since the other materials are present as finely divided particles, no difficulty arises in the incorporation of fiber in any amount and of any character. Admixture may be dry or wet. In the latter event, I use latex or a dilution thereof. Because of the penetrating nature of latex, it is practicable to apply the undiluted latex directly to a wet pulp or body of the other ingredients. I rarely use more latex than would correspond to about 5 per cent latex caoutchouc in the final hard rubber. The mixture is ordinarily dried to convert the latex solids into gel, is then further subjected to drying under, advantageously, reduced pressure, molded, pressed and cured. In curing or vulcanization of the composition, the hard rubber, the partially cured rubber and the rubber from the latex are substantially completely cured and converted into a homogeneous mass. The final article made as so far described consists of hard cured rubber; this rubber, however, coming from two or three sources. As latex is a liquid which freely permeates fiber and fiber bundles, passing into even capillary pores, the unitary hard rubber mass permeates the fiber in so far as this fiber is open or porous in texture. Compositions made as so far described without the use of special fillers are particularly adapted for such severe uses as battery jars and plates, separator plates, electrical insulations, panels, etc.

For some uses, a certain amount of filler may be admixed with the composition produced as so far described; this filler being any of those usually employed in compounding hard rubber. Sometimes the presence of this filler is desirable; sometimes not.

In the present invention I have devised a method of producing hard rubber in which the physical characteristics of the coarse compounded ingredients are not injured as is the case in the ordinary milling treatments. This invention is useful in the production of many other articles and is not limited in this respect to articles containing fiber, although in most embodiments of my invention I use more or less reenforcing fiber. The reenforcement fiber is particularly useful in strengthening and toughening the hard rubber, whether the hard rubber be used as a molded article by itself or as a bonding means for other things. It lessens the tendency of the rubber to shatter, crack, pit and fissure under bending strains. One particularly useful field for the present invention is in the manufacture of rubber bonded abrasives, as set forth in detail in my stated copending application, Ser. No. 601,910.

In the manufacture of rubber bonded abrasives, the grains of abrasives are usually milled with and into the rubber. This is not only hard on the milling rolls but also tends to shatter, disintegrate and dull or round the abrasive grains themselves. In milling, the grains abrade each other, dulling and rounding their cutting or abrasive edges and angles and produce fines which form part of the final composition. In an abrasive wheel so made there is always fine abrasive, even where only definite sized grains were used in the mixture. The presence of this fine abrasive is deleterious to the clean cutting action and causes undue heating. But by simply mixing the abrasive grains with the other components of the final article in the manner of the present invention and bonding with latex caoutchouc no injury of the abrasive grains occurs, and the finished product contains the chosen size grains only and is, in consequence, uniform in its action and is relatively free cutting.

In making such articles, I customarily use fiber in the rubber. In abrasive wheels and similar articles, the added toughness and strength given by fiber in the hard rubber are particularly advantageous. As the abrasive material, I may use any of the ordinary abrasive materials, such as carborundum, alundum, siloxicon, corundum, silica, natural emery, garnet, etc.

In making these and other fiber reenforced hard rubber composition under the present invention, I usually employ about equal parts of hard rubber dust and of buffings from incompletely vulcanized rubber. For reenforcing purposes, 5 per cent of cotton fiber is usually satisfactory. There should be enough sulfur to hard cure the latex rubber and the partially cured rubber. In using fibrous material from rubber reclaiming, the rubber and fiber are both utilized. In lieu of the cotton fiber I may, of course, use any other fibrous material and I may, at times, increase the amount of fiber materially above the amount above stated, 5 per cent. Jute, linen, wool, etc., fibers are advantageous in certain relations. In other relations, asbestos fibers may be employed, as in making asbestos gaskets. The materials are stirred together and uniformly compounded and are then moistened with latex. The latex solution may, of course, be used directly in making the mixture. The water is dried out to convert the latex into a dry gel and the composition heated and compacted, with a final heating under vulcanizing conditions appropriate for converting all the rubbery materials into hard rubber. Such a composition as just described makes a good battery plate and is useful for many other purposes because of the toughness imparted by the long fiber. Even a small amount of long fiber incorporated into the hard rubber in the manner described gives a highly advantageous resistance to breaking and cracking under bending stresses. The hard rubber does not shatter or break readily.

As stated, any ordinary vegetable or mineral fibers may be used in practicing the process of the present invention, provided the fibers are sufficiently long to give a reenforcing action. In the case of asbestos, it is often desirable or necessary to purify it before use. This is not, however, ordinarily necessary with vegetable fibers.

What I claim is:—

In the manufacture of articles composed of or comprising hard rubber, the process which comprises admixing comminuted hard rubber, disintegrated partially cured rubber, sulfur, fiber and rubber latex, drying, molding and vulcanizing.

In testimony whereof, I have hereunto affixed my signature.

WILLIAM BURTON WESCOTT.